July 12, 1960 W. H. CORBAN ET AL 2,944,315
TILE SETTER

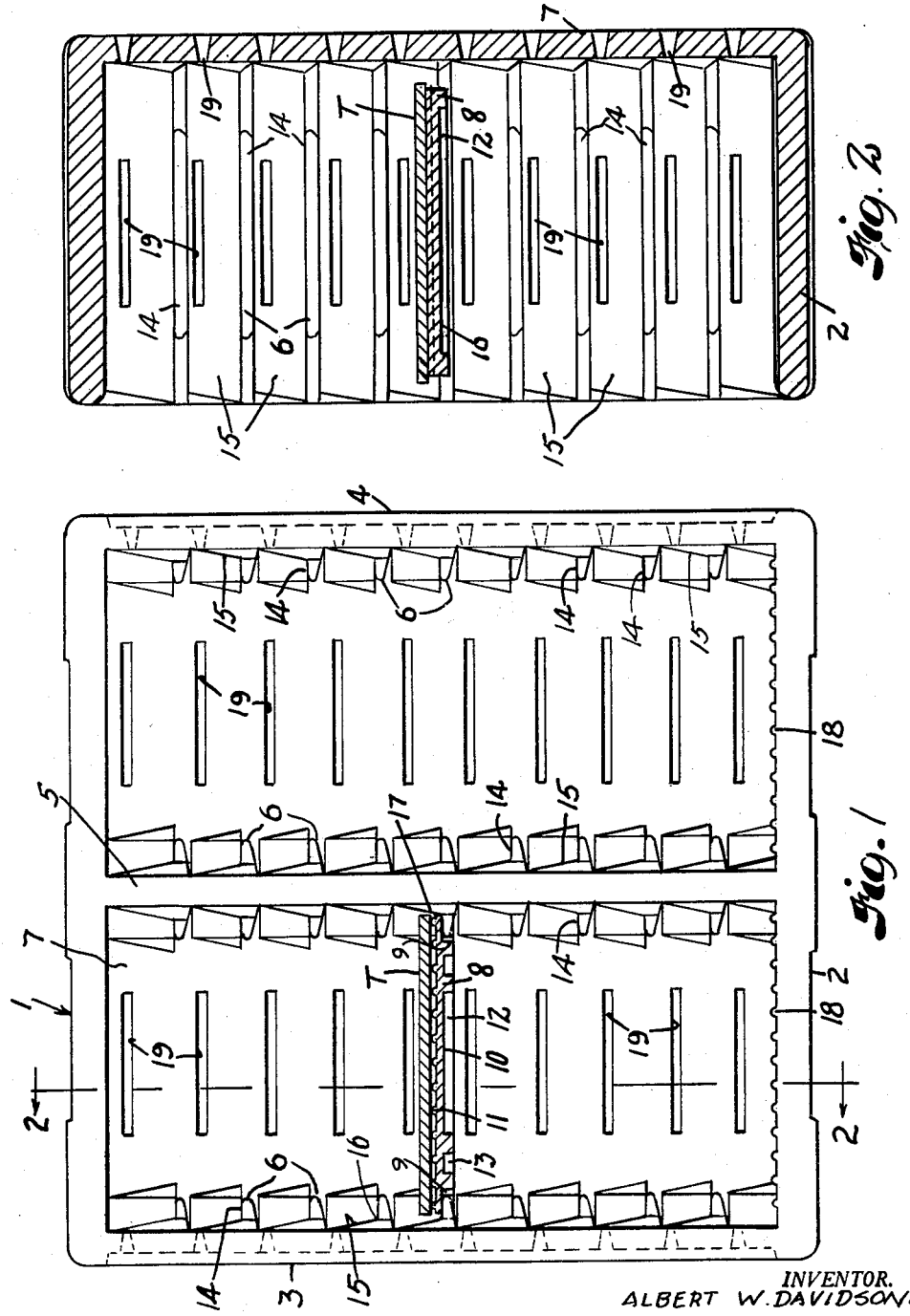

Filed July 23, 1956 2 Sheets-Sheet 2

INVENTORS
ALBERT W. DAVIDSON AND
BY WILBUR HALL CORBAN

Oberlin & Limbach
ATTORNEYS.

United States Patent Office 2,944,315
Patented July 12, 1960

2,944,315
TILE SETTER

Wilbur Hall Corban, Zanesville, Ohio, and Albert W. Davidson, Matawan, N.J., assignors to Ferro Corporation, Cleveland, Ohio, a corporation of Ohio, and Architectural Tiling Co., Inc., Keyport, N.J., a corporation of New Jersey Filed July 23, 1956, Ser. No. 599,599
3 Claims. (Cl. 25—153)

This invention relates, as indicated, to tile setters and has more particular reference to improved means for exposing ceramic ware to the heat of a kiln during the firing operation.

An object of this invention includes improvements in details of construction whereby a one fire tile setter is provided with removable tile setter plates which are capable of being locked into position.

A further object of this invention is to provide a refractory one fire tile setter in the form of a rack which will support a plurality of ceramic bodies in spaced relation, which is so constructed that the glaze surfaces of the ceramic bodies being fired cannot come in contact with the sides and/or back wall of the setter.

Other objects will appear as the description proceeds.

To the accomplishments of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a front elevational view of an embodiment of the present invention;

Fig. 2 is a transverse cross-sectional view through line 2—2 of Fig. 1;

Figure 3:
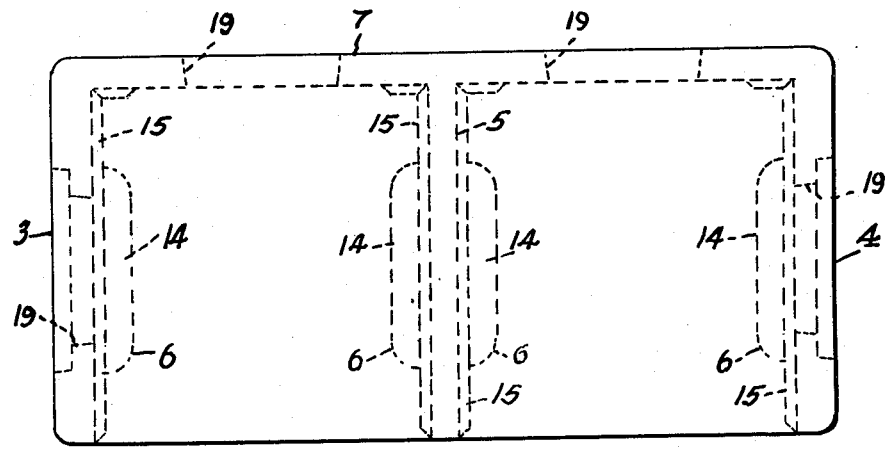
Fig. 3 is a top plan view of Fig. 1.
Figure 4:
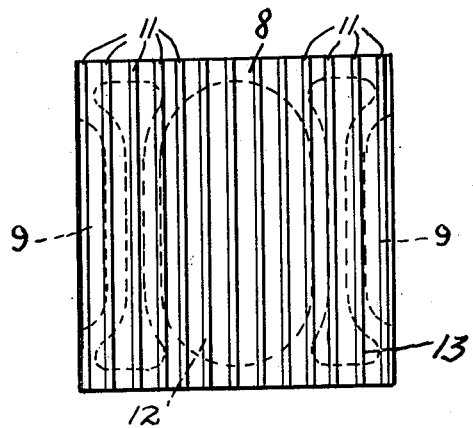
Fig. 4 is a plan view of a tile setter plate of this invention.

Referring more specifically to the drawings, the present invention consists of a substantially symmetrical one-piece setter comprising end plates 1 and 2, side walls 3 and 4, center post 5, supporting ledges 6 and back wall 7. In combination with said setter are a plurality of tile setter plates 8, which are removable and can be locked into position as will be described in more detail. It will be noted that it is entirely within the contemplation of the present invention to produce a single tile setter with or without back wall. That is, instead of the double setter shown in the drawings one can be made which only supports a single row of tiles. However, we have found that for economical firing of tiles a double setter is preferred.

The setters of the present invention constitute a one-piece structure composed of refractory material which is fired in an appropriate kiln and which is capable of withstanding the high heat employed in kilns for firing tiles and other ceramic bodies.

Referring now to Fig. 1, the side walls 3 and 4 and center post 5 are provided with supporting ledges 6, which are in opposing relation. Ledges 6 are substantially parallel with each other. Ledges 6 support tile setter plates 8 and are of a size so as to give a substantially snug fit into indentations 9 of tile setter plate 8.

Attention is directed to the details of tile setter plates 8. Each tile setter plate 8 is provided with load bearing surface 10 which contains substantially equally spaced parallel ridges 11 which form an area of minimum contact with the ceramic body being fired. The inner face of bottom wall 2 is provided with ridges 18 thus affording an extra firing surface for tile. Indentations 9 are of such size and shape so as when placed on ledges 6, ledges 6 substantially snugly fit into indentations 9, thereby locking tile setter plates 8 in place. Tile setter plates have also been hollowed out as at 12 and 13 so as to give a minimum weight plus maximum strength.

Figure 5:
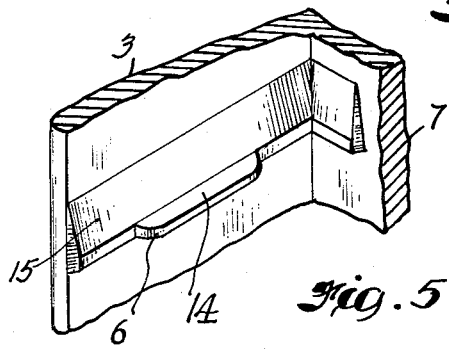
Fig. 5 is a perspective view of an inside back corner of the structure illustrated in Figs. 1–3 inclusive.

Looking at ledges 6 it will be seen that they have load bearing surface 14 and adjacent surface 15 which form an angle 16 which is greater than 90°. This is necessary so that the ceramic body being fired has a minimum contact with the walls of the setter. As shown in Fig. 1, tile T resting on setter plate 8 only has a point to point contact with wall 15 as shown at point 17. Back wall 7 and side walls 3 and 4 are provided with slots 19 so as to provide free circulation of heated air thus allowing equal heat distribution throughout the entire compact. The inward projections along the side walls 3 from which the ledges 6 extend and on which the incline surfaces 15 are formed, extend the entire width of the side walls 3 but as most clearly illustrated in Fig. 5 extend only for a short distance from the sides toward the center of the back walls 7. The plate 8 supported on the ledges 6 and on which the tiles are supported are thus prevented from moving all of the way back into contact with the inner face of the back wall 7. The extentions of the surface 15 on the back wall 7 insure against the work having contact with the back wall in the corners and since the plates are spaced from the back wall otherwise, the work is precluded from touching the back wall, while at the same time provide a space between the plate and the back wall for gas circulation in conjunction with the opening 19.

From the foregoing discussion it will be seen that the present invention has provided a tile setter with removable setter plates which are capable of being locked into position thus avoiding the necessity of cementing the individual setter plates in place. Further, it will be seen due to the construction of the setter plate the entire compact has a minimum weight of refractory per weight of ceramic bodies fired. Further, the tile setter of the present invention which comprises the compact with removable setter plates provides an easy and economical means for easily replacing defective setter plates.

Other modes of applying the principle of the invention may be employed, changes being made as regards the details described, provided the features stated in any of the following claims or the equivalent of such be employed.

We, therefor, particularly point out and distinctly claim as our invention:

1. A one piece ceramic compact for firing tile and a plurality of tile setter plates mounted in detachable interlocked relation on said compact and adapted to support tile thereon, said compact comprising top and bottom walls, side walls and a back wall to form a rigid compact of box-like open front configuration, a plurality of series of supporting ledges integrally formed on the inner surfaces of said side walls and said back wall and extending generally transversely of the respective wall in substantially parallel relation with respect to one another, each of said ledges comprising a section extending substantially completely across the respective of said side walls and a section extending only partially across said back wall, each of said side wall ledge sections having a support portion intermediate its ends that extends inwardly from the respective side wall a greater amount than the remainder of the respective side wall ledge section, each side and back wall ledge section having an upwardly and obliquely extending inwardly facing surface disposed above the elevation of said support portion, said support portion providing an upwardly facing flat horizontal surface of predetermined extent and being received in a complementary indentation on the underside of an associated one of said setter plates for supporting the latter on said side walls in vertically detachable and horizontally interlocked relation, said back wall ledge sections each comprising an abutment surface immediately below its respective obliquely extending surface, said abutment surface being disposed in generally confronting relation with an edge of an associated setter plate for preventing inadvertent movement of the associated setter plate into engagement with said back wall and thus positively maintaining a spacing between the setter plates and said back wall for circulation of hot gases therebetween during the tile firing operation, said obliquely extending surfaces of said back and side wall ledge sections being so disposed with respect to a plane passing through said flat horizontal surface of the respective of said support portions to form an angle which in side elevation is greater than 90°, for preventing flat surface-to-surface contact between said ledge sections and the tile during firing operations.

2. The combination of claim 1 wherein said side walls have generally vertically spaced openings therethrough, said openings being disposed intermediate said ledges and increasing the circulation of hot gases through said compact during firing operations.

3. In combination, a one piece ceramic compact for firing tile and a plurality of setter plates mounted in detachable interlocking relationship with said compact, said compact comprising top and bottom walls, a center wall extending between said top and bottom members, side walls substantially equal distance from said center wall and extending between said top and bottom walls, and a back wall extending between said side walls and said top and bottom walls to form an integral rigid compact of box-like open front configuration, a plurality of series of ledges disposed interiorly of said compact on said side and back walls and formed integrally with the respective wall, said ledges extending transversely of the respective walls in substantially parallel relation with respect to one another, each of said ledges on its respective walls comprising a section extending generally completely across the side and center walls and a section extending only partially across said back wall, each side and center wall ledge section having a support portion intermediate its ends which extends a greater amount inwardly from the respective wall than the remainder of the wall ledge section, each side, center and back wall ledge section having an upwardly and obliquely extending inwardly facing surface disposed above the elevation of the respective support portion, each of said support portions providing an upwardly facing flat horizontal surface of predetermined extent, each of said setter plates having an open-faced indentation adjacent each side extremity of the setter plate on the bottom surface thereof, said support portions on said ledges being received in generally snug relation in said indentations in the associated setter plate for interlocking said setter plates in supported relation on said ledges and against movement in a generally horizontal plane while permitting ready removal of said setter plates by upward vertical movement of the latter with respect to said ledges, each of said back wall ledge sections comprising an abutment surface immediately below its respective obliquely extending surface and disposed in generally confronting relation with an edge of an associated setter plate for preventing inadvertent movement of the setter plates into engagement with the back wall and thus maintaining a spacing between the setter plates and the back wall for circulation of hot gases therebetween during tile firing operations, said obliquely extending surfaces on said side, center and back wall ledge sections being so disposed with respect to a horizontal plane passing through said flat surfaces of the respective of said support portions that an angular relationship of greater than 90° in side elevation is formed between said last mentioned horizontal plane and the respective of said obliquely extending surfaces of said ledge sections for preventing flat surface-to-surface contact between said ledge sections and the tile during firing operations, said side and back walls have a plurality of generally vertically spaced openings therethrough, said openings in said back wall being disposed intermediate said back wall ledge sections and said openings in said side walls being disposed intermediate said side wall ledge sections.

References Cited in the file of this patent

UNITED STATES PATENTS

| | | |
|---|---|---|
| 754,816 | Schriefer | Mar. 15, 1904 |
| 754,817 | Schriefer | Mar. 15, 1904 |
| 1,778,561 | McCoy | Oct. 14, 1930 |
| 1,802,235 | Cambell | Apr. 21, 1931 |
| 1,848,200 | Robison | Mar. 8, 1932 |
| 2,567,609 | Lovatt | Sept. 11, 1951 |
| 2,602,984 | Owen | July 15, 1952 |
| 2,733,497 | Criswell | Feb. 7, 1956 |

FOREIGN PATENTS

| | | |
|---|---|---|
| 428,016 | France | June 12, 1911 |
| 601,880 | Great Britain | May 13, 1948 |
| 636,515 | Great Britain | May 3, 1950 |